United States Patent
Dunn et al.

(10) Patent No.: US 9,950,500 B2
(45) Date of Patent: Apr. 24, 2018

(54) GLASS ASSEMBLY

(75) Inventors: William Dunn, Alpharetta, GA (US); Michael LeCave, Gainesville, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 475 days.

(21) Appl. No.: 13/296,981

(22) Filed: Nov. 15, 2011

(65) Prior Publication Data

US 2012/0295051 A1    Nov. 22, 2012

Related U.S. Application Data

(63) Continuation of application No. 12/125,046, filed on May 21, 2008.

(51) Int. Cl.
*G02F 1/1333* (2006.01)
*B32B 17/10* (2006.01)

(52) U.S. Cl.
CPC .. *B32B 17/10908* (2013.01); *B32B 17/10954* (2013.01); *G02F 1/133308* (2013.01); *B32B 2457/202* (2013.01); *G02F 2001/13332* (2013.01); *G02F 2001/133331* (2013.01); *G02F 2202/28* (2013.01); *Y10T 156/1089* (2015.01); *Y10T 428/1241* (2015.01); *Y10T 428/2419* (2015.01); *Y10T 428/24999* (2015.04)

(58) Field of Classification Search
None
See application file for complete search history.

(56) References Cited

U.S. PATENT DOCUMENTS

| | | |
|---|---|---|
| 3,823,794 A | 7/1974 | Bre |
| 4,007,552 A | 2/1977 | Brooks |
| 4,093,355 A | 6/1978 | Kaplit et al. |
| 4,297,401 A | 10/1981 | Chern et al. |
| 4,593,978 A | 6/1986 | Mourey et al. |
| 4,604,444 A | 8/1986 | Donnadieu et al. |
| 4,634,225 A | 1/1987 | Haim et al. |
| 4,640,584 A | 2/1987 | Tsuboyama et al. |

(Continued)

FOREIGN PATENT DOCUMENTS

| | | |
|---|---|---|
| AU | 200324399 B2 | 11/2003 |
| AU | 2003285975 A1 | 6/2004 |

(Continued)

OTHER PUBLICATIONS

Dave Roos, How Transmissive Film Works, 2008, 9 Pages.

(Continued)

*Primary Examiner* — Anthony J Frost
(74) *Attorney, Agent, or Firm* — Standley Law Group LLP

(57) ABSTRACT

A glass assembly having a first glass component, a frame overlapping the perimeter and top surface of the first glass component, a second glass component atop the frame, and a layer of adhesive interposed between the two glass components. Also disclosed is a frame for bonding two glass components. Also disclosed is a protective glass assembly for a LCD having a top surface and perimeter. The protective glass assembly having a frame which overlaps the top surface and perimeter of the LCD, a glass component placed atop the frame, and a layer of optical adhesive interposed between the LCD and the glass component.

19 Claims, 3 Drawing Sheets

(56) References Cited

U.S. PATENT DOCUMENTS

| | | |
|---|---|---|
| 4,691,995 A | 9/1987 | Yamazaki et al. |
| 4,712,875 A | 12/1987 | Tsuboyama et al. |
| 4,715,686 A | 12/1987 | Iwashita et al. |
| 4,724,023 A | 2/1988 | Marriott |
| 4,766,176 A | 8/1988 | Lee et al. |
| 5,029,982 A | 7/1991 | Nash |
| 5,059,484 A | 10/1991 | Clark et al. |
| 5,066,699 A | 11/1991 | Lee et al. |
| 5,088,806 A | 2/1992 | McCartney et al. |
| 5,247,374 A | 9/1993 | Terada |
| 5,330,262 A | 7/1994 | Peters |
| 5,365,354 A | 11/1994 | Jannson et al. |
| 5,379,139 A | 1/1995 | Sato et al. |
| 5,402,141 A | 3/1995 | Haim et al. |
| 5,406,399 A * | 4/1995 | Koike ............... 349/58 |
| 5,547,483 A | 8/1996 | Garcia et al. |
| 5,548,038 A | 8/1996 | Enami et al. |
| 5,559,614 A | 9/1996 | Urbish et al. |
| 5,606,438 A | 2/1997 | Margalit et al. |
| 5,610,742 A | 3/1997 | Hinata et al. |
| 5,656,824 A | 8/1997 | den Boer et al. |
| 5,661,210 A | 8/1997 | Bums et al. |
| 5,748,269 A | 5/1998 | Harris et al. |
| 5,767,489 A | 6/1998 | Ferrier |
| 5,818,010 A | 10/1998 | McCann |
| 5,838,405 A * | 11/1998 | Izumi ............... G02F 1/1339 156/275.7 |
| 5,869,919 A | 2/1999 | Sato et al. |
| 5,899,027 A | 5/1999 | St. Louis |
| 5,911,899 A | 6/1999 | Yoshikai et al. |
| 5,937,611 A | 8/1999 | Howes |
| 5,991,153 A | 11/1999 | Heady et al. |
| 6,074,741 A | 6/2000 | Murata et al. |
| 6,089,751 A | 7/2000 | Conover et al. |
| 6,099,672 A | 8/2000 | Yamazaki et al. |
| 6,157,432 A | 12/2000 | Helbing |
| 6,191,839 B1 | 2/2001 | Briley et al. |
| 6,198,515 B1 | 3/2001 | Cole |
| 6,211,934 B1 | 4/2001 | Habing et al. |
| 6,219,127 B1 | 4/2001 | Hirakata et al. |
| 6,359,390 B1 | 3/2002 | Nagai |
| 6,392,727 B1 | 5/2002 | Larson et al. |
| 6,398,371 B1 | 6/2002 | Matsunaga et al. |
| 6,417,900 B1 | 7/2002 | Shin et al. |
| 6,421,103 B2 | 7/2002 | Yamaguchi |
| 6,437,673 B1 | 8/2002 | Nishida et al. |
| 6,446,467 B1 | 9/2002 | Lieberman et al. |
| 6,451,870 B1 | 9/2002 | DeCato et al. |
| 6,465,092 B1 * | 10/2002 | Takushima ............... B32B 27/06 359/350 |
| 6,472,032 B1 | 10/2002 | Asano |
| 6,504,713 B1 | 1/2003 | Pandolfi et al. |
| 6,512,562 B1 | 1/2003 | Kobayashi et al. |
| 6,535,266 B1 | 3/2003 | Nemeth et al. |
| 6,555,235 B1 * | 4/2003 | Aufderheide .......... C09J 183/04 156/329 |
| 6,611,302 B1 * | 8/2003 | Ueda ................. G02F 1/133308 349/58 |
| 6,628,355 B1 | 9/2003 | Takahara |
| 6,650,393 B1 | 11/2003 | Nishiguchi |
| 6,683,639 B2 | 1/2004 | Driessen-Olde Scheper et al. |
| 6,692,986 B1 | 2/2004 | Bayer et al. |
| 6,727,468 B1 | 4/2004 | Nemeth |
| 6,731,357 B1 | 5/2004 | Tachibana et al. |
| 6,731,367 B1 | 5/2004 | Saitoh |
| 6,747,720 B2 | 6/2004 | Saiki et al. |
| 6,762,471 B2 | 7/2004 | Kim |
| 6,818,721 B2 | 11/2004 | Zha et al. |
| 6,825,899 B2 * | 11/2004 | Kobayashi ........ G02F 1/133514 349/106 |
| 6,830,348 B2 | 12/2004 | Nakamura et al. |
| 6,839,104 B2 | 1/2005 | Taniguchi et al. |
| 6,873,387 B2 | 3/2005 | Hokazono et al. |
| 6,885,412 B2 | 4/2005 | Ohnishi et al. |
| 6,909,486 B2 | 4/2005 | Wang et al. |
| 6,943,768 B2 | 9/2005 | Cavanaugh et al. |
| 6,955,833 B1 | 10/2005 | Gallego |
| 6,961,108 B2 | 11/2005 | Wang et al. |
| 7,052,152 B2 | 5/2006 | Harbers et al. |
| 7,059,757 B2 | 6/2006 | Shimizu |
| 7,083,285 B2 | 8/2006 | Hsu et al. |
| 7,161,642 B2 | 1/2007 | Kim et al. |
| 7,194,158 B2 | 3/2007 | Schultheis et al. |
| 7,218,812 B2 | 5/2007 | Maxwell et al. |
| 7,230,659 B2 | 6/2007 | Ha et al. |
| 7,232,250 B2 | 6/2007 | Chuang |
| 7,283,185 B2 | 10/2007 | Hirakata et al. |
| 7,295,179 B2 | 11/2007 | Dunn |
| 7,481,553 B2 | 1/2009 | Kim et al. |
| 7,481,566 B2 | 1/2009 | Han |
| 7,633,583 B2 | 12/2009 | Wang et al. |
| 7,798,694 B2 | 9/2010 | Hwang |
| 7,811,640 B2 | 10/2010 | Charters et al. |
| 7,922,381 B2 | 4/2011 | Han et al. |
| 7,923,071 B2 | 4/2011 | Charters et al. |
| 7,924,362 B2 | 4/2011 | Slobodin |
| 8,004,648 B2 | 8/2011 | Dunn |
| 8,009,262 B2 | 8/2011 | Dunn |
| 8,021,900 B2 | 9/2011 | Maxwell et al. |
| 8,120,595 B2 | 2/2012 | Kukulj et al. |
| 8,208,115 B2 | 6/2012 | Dunn |
| 8,242,974 B2 | 8/2012 | Yamazaki et al. |
| 8,269,916 B2 | 9/2012 | Ohkawa |
| 8,274,626 B2 | 9/2012 | Choi et al. |
| 8,294,168 B2 | 10/2012 | Park et al. |
| 8,529,993 B2 | 9/2013 | Charters et al. |
| 8,562,770 B2 | 10/2013 | Dunn et al. |
| 8,674,390 B2 | 3/2014 | Harris et al. |
| 8,674,963 B2 | 3/2014 | Cornish et al. |
| 8,711,321 B2 | 4/2014 | Dunn et al. |
| 8,827,472 B2 | 9/2014 | Takada |
| 8,879,042 B2 | 11/2014 | Dunn et al. |
| 9,317,060 B2 | 4/2016 | Dunn et al. |
| 9,573,346 B2 | 2/2017 | Dunn et al. |
| 2001/0001459 A1 | 5/2001 | Savant et al. |
| 2001/0019454 A1 | 9/2001 | Tadic-Galeb et al. |
| 2001/0043293 A1 | 11/2001 | Inoue |
| 2002/0033919 A1 | 3/2002 | Sanelle et al. |
| 2002/0042162 A1 | 4/2002 | Tone et al. |
| 2002/0101553 A1 | 8/2002 | Enomoto et al. |
| 2002/0126248 A1 | 9/2002 | Yoshida |
| 2002/0149714 A1 | 10/2002 | Anderson et al. |
| 2002/0186333 A1 | 12/2002 | Ha et al. |
| 2002/0187575 A1 | 12/2002 | Maruyama et al. |
| 2003/0007109 A1 | 1/2003 | Park |
| 2003/0026085 A1 | 2/2003 | Ueda et al. |
| 2003/0090810 A1 | 5/2003 | Detro et al. |
| 2004/0018375 A1 | 1/2004 | Banno et al. |
| 2004/0032638 A1 | 2/2004 | Tonar et al. |
| 2004/0036834 A1 | 2/2004 | Ohnishi et al. |
| 2004/0062029 A1 | 4/2004 | Ato |
| 2004/0105159 A1 | 6/2004 | Saccomanno et al. |
| 2004/0113044 A1 | 6/2004 | Ishiguchi |
| 2004/0155997 A1 | 8/2004 | West et al. |
| 2004/0165139 A1 | 8/2004 | Anderson et al. |
| 2004/0239823 A1 | 12/2004 | Silsby et al. |
| 2005/0012722 A1 | 1/2005 | Chon |
| 2005/0062373 A1 | 3/2005 | Kim et al. |
| 2005/0073632 A1 | 4/2005 | Dunn et al. |
| 2005/0073640 A1 | 4/2005 | Dunn et al. |
| 2005/0105178 A1 | 5/2005 | Kim |
| 2005/0115670 A1 | 6/2005 | Bettinellli et al. |
| 2005/0134526 A1 | 6/2005 | Willem et al. |
| 2005/0286131 A1 | 12/2005 | Saxena et al. |
| 2006/0082271 A1 | 4/2006 | Lee et al. |
| 2006/0082700 A1 | 4/2006 | Gehlsen et al. |
| 2006/0092348 A1 | 5/2006 | Park |
| 2006/0103299 A1 | 5/2006 | Kwok et al. |
| 2006/0132699 A1 | 6/2006 | Cho et al. |
| 2006/0159867 A1 | 7/2006 | O'Donnell |
| 2006/0209266 A1 | 9/2006 | Utsunomiya |
| 2006/0262258 A1 | 11/2006 | Wang et al. |
| 2006/0274237 A1 | 12/2006 | Nelson et al. |

(56) References Cited

U.S. PATENT DOCUMENTS

| | | |
|---|---|---|
| 2006/0279946 A1 | 12/2006 | Park et al. |
| 2006/0289201 A1 | 12/2006 | Kim et al. |
| 2007/0065091 A1 | 3/2007 | Hinata et al. |
| 2007/0103854 A1* | 5/2007 | Yu .................. G06F 1/1601 361/679.22 |
| 2007/0139574 A1 | 6/2007 | Ko et al. |
| 2007/0151664 A1 | 7/2007 | Shin |
| 2007/0200095 A1 | 8/2007 | Murazaki |
| 2007/0206158 A1 | 9/2007 | Kinoshita et al. |
| 2007/0230218 A1 | 10/2007 | Jachim et al. |
| 2007/0267174 A1 | 11/2007 | Kim |
| 2007/0268201 A1 | 11/2007 | Sampsell et al. |
| 2007/0279556 A1 | 12/2007 | Wang et al. |
| 2008/0049164 A1 | 2/2008 | Jeon et al. |
| 2008/0083906 A1 | 4/2008 | Takahara et al. |
| 2008/0111949 A1 | 5/2008 | Shibata et al. |
| 2008/0111958 A1 | 5/2008 | Kleverman et al. |
| 2008/0146709 A1 | 6/2008 | Aketa et al. |
| 2008/0151082 A1 | 6/2008 | Chan |
| 2008/0176345 A1 | 7/2008 | Yu et al. |
| 2008/0230177 A1 | 9/2008 | Grouser et al. |
| 2008/0261057 A1 | 10/2008 | Slobodin |
| 2008/0284942 A1 | 11/2008 | Mahama et al. |
| 2009/0015747 A1 | 1/2009 | Nishizawa et al. |
| 2009/0015761 A1 | 1/2009 | Stockham |
| 2009/0088547 A1 | 4/2009 | Schamschurin et al. |
| 2009/0104989 A1 | 4/2009 | Williams et al. |
| 2009/0153780 A1 | 6/2009 | Takata |
| 2009/0251650 A1 | 10/2009 | Fukagawa et al. |
| 2010/0039696 A1 | 2/2010 | de Groot et al. |
| 2010/0253660 A1 | 10/2010 | Hashimoto |
| 2010/0307800 A1 | 12/2010 | Wee et al. |
| 2011/0019363 A1 | 1/2011 | Vahlsing et al. |
| 2011/0090630 A1 | 4/2011 | Bergeron et al. |
| 2011/0151197 A1 | 6/2011 | Charters et al. |
| 2011/0194053 A1 | 8/2011 | Tannas |
| 2011/0205472 A1 | 8/2011 | Kobayashi et al. |
| 2011/0221995 A1 | 9/2011 | Park |
| 2012/0050958 A1 | 3/2012 | Sanford et al. |
| 2012/0069273 A1 | 3/2012 | Watanabe |
| 2012/0111479 A1 | 5/2012 | Sung et al. |
| 2012/0154712 A1 | 6/2012 | Yu et al. |
| 2012/0242926 A1 | 9/2012 | Hsu et al. |
| 2012/0275023 A1 | 11/2012 | Weber et al. |
| 2012/0295051 A1 | 11/2012 | Dunn et al. |
| 2013/0027633 A1 | 1/2013 | Park et al. |
| 2013/0051200 A1 | 2/2013 | Oshio |
| 2013/0094160 A1 | 4/2013 | Narumi |
| 2013/0163277 A1 | 6/2013 | Kim et al. |
| 2013/0287368 A1 | 10/2013 | Lefevre et al. |
| 2013/0329363 A1 | 12/2013 | Dunn et al. |
| 2014/0118221 A1 | 5/2014 | Park et al. |
| 2014/0268657 A1 | 9/2014 | Dunn et al. |
| 2014/0285732 A1 | 9/2014 | Tanabe et al. |
| 2015/0177480 A1 | 6/2015 | Bullock et al. |
| 2016/0037657 A1 | 2/2016 | Yoshizumi |
| 2017/0210668 A1 | 7/2017 | Dunn et al. |

FOREIGN PATENT DOCUMENTS

| | | |
|---|---|---|
| AU | 2006214795 A1 | 8/2007 |
| CN | 1720282 A | 1/2006 |
| CN | 101142532 A | 3/2008 |
| CN | 101541863 A | 9/2009 |
| CN | 202815379 U | 3/2013 |
| EP | 1576033 A1 | 9/2005 |
| EP | 1640337 A2 | 3/2006 |
| EP | 1678534 A1 | 7/2006 |
| EP | 1851591 A1 | 11/2007 |
| EP | 1923406 A1 | 5/2008 |
| GB | 2402205 A | 12/2004 |
| JP | 62197335 A | 9/1987 |
| JP | 3153212 A | 7/1991 |
| JP | 8194437 A | 7/1996 |
| JP | H08271883 | 10/1996 |
| JP | 11160727 A | 6/1999 |
| JP | 2002158475 A | 2/2002 |
| JP | 2004205599 A | 7/2004 |
| JP | 2005029579 A | 2/2005 |
| JP | 2005055641 A | 3/2005 |
| JP | 2005121940 A | 5/2005 |
| JP | 2005134849 A | 5/2005 |
| JP | 2005225793 A | 8/2005 |
| JP | 2006508216 B2 | 9/2006 |
| JP | 2008530317 A | 8/2008 |
| JP | 2008292743 A | 12/2008 |
| JP | 2010506982 A | 3/2010 |
| JP | 2013080242 A | 5/2013 |
| KR | 20040097466 A | 11/2004 |
| KR | 20050084086 A | 8/2005 |
| KR | 1020060016469 A | 2/2006 |
| KR | 100666961 B1 | 1/2007 |
| KR | 1020070070675 A | 7/2007 |
| KR | 1020070103069 A | 10/2007 |
| KR | 20080046335 A | 5/2008 |
| KR | 20080086245 A | 9/2008 |
| KR | 1020090064588 A | 6/2009 |
| TW | 200702904 A | 1/2007 |
| TW | 200809287 A | 2/2008 |
| TW | 200838901 A | 10/2008 |
| TW | 201114716 A | 5/2011 |
| WO | WO2004036270 A1 | 4/2004 |
| WO | WO2005079129 A1 | 8/2005 |
| WO | WO2011049564 A1 | 4/2011 |
| WO | WO2012073929 A1 | 6/2012 |
| WO | WO2014149502 A1 | 9/2014 |

OTHER PUBLICATIONS

Cytec, Uvekol S UV Curable Glass Laminating System, May 4, 2006, 1 Page.
Schott, Glass Made of Ideas: Opalika, 2 Pages.
Pilkington Building Products, Pilkington OptiView Anti-Reflective Glass, 2005, 2 Pages.
T.M. Zeef, T.H. Hubing, J.L. Drewniak, R.E. Dussroff & T.P. Van Doren, EMC Analysis of an 18" LCD Monitor, Aug. 21-25, 2000, 1 Page.
3M Optical Systems, Immerse Yourself in Color, 2013, 4 Pages.
Wikipedia, Sol-gel, 2016, 12 Pages.
Panel-Brite, Inc., AOT (Advanced Optibond Technology), Mar. 11, 2009, 1 Page.
Dow Corning Corporation, Information About High Technology Silicone Materials, 1992, 4 Pages.
Dow Corning Corporation, Material Safety Data Sheet, Mar. 29, 2011, 8 Pages.
Pilkington Building & Speciality Glass Products, Pilkington TEC Glass for the Refrigeration Market, 2002, 2 Pages.

* cited by examiner

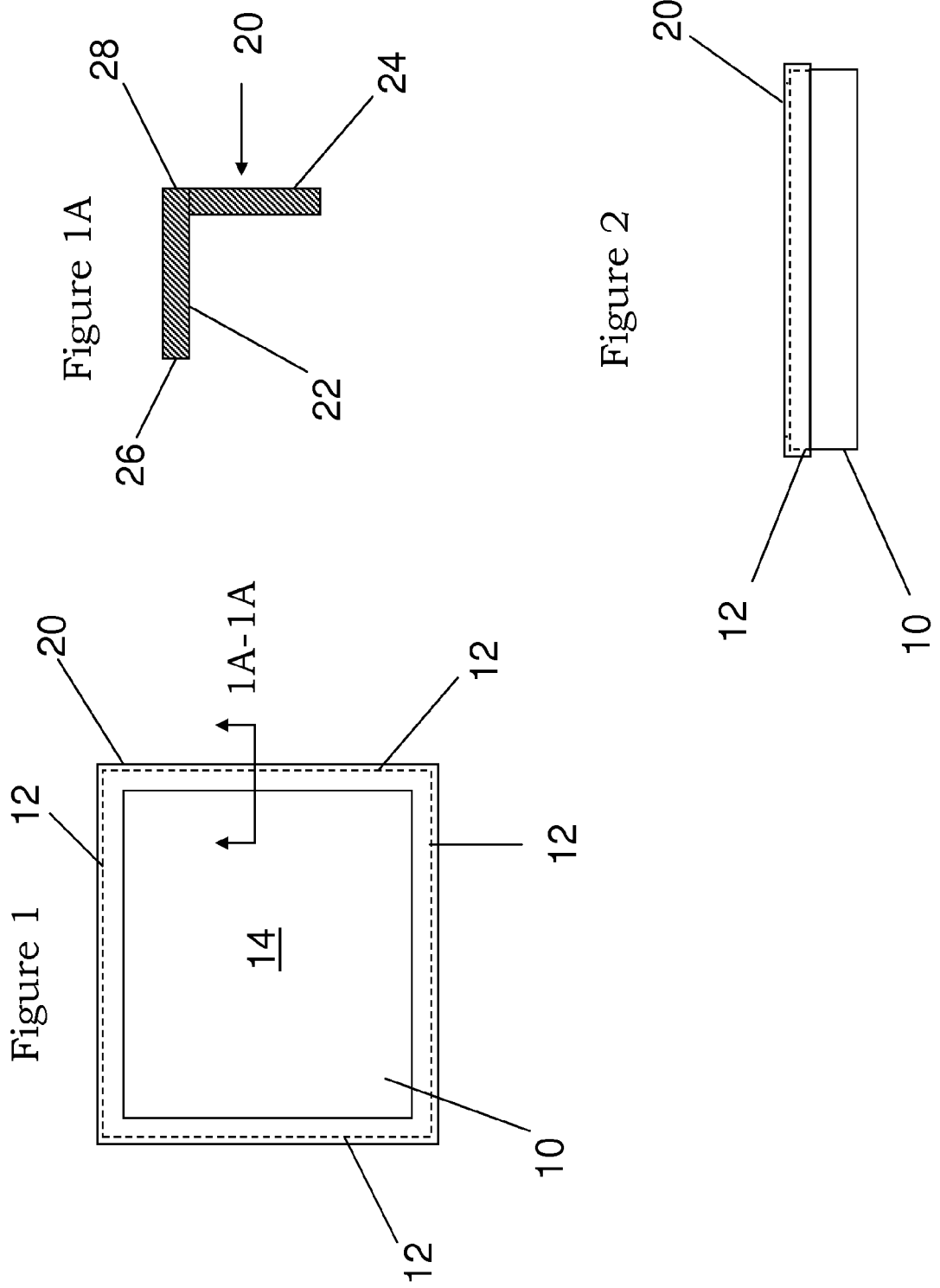

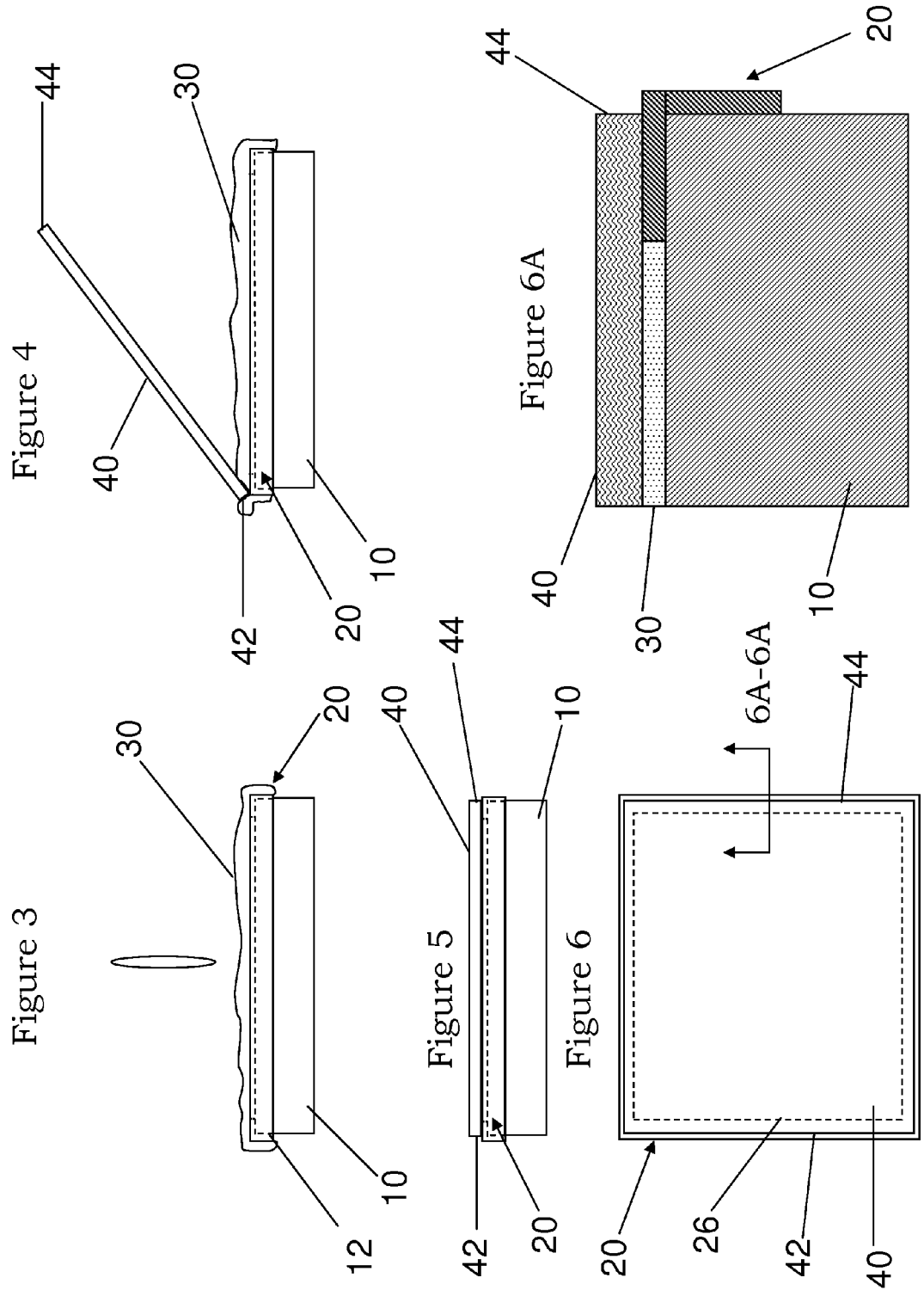

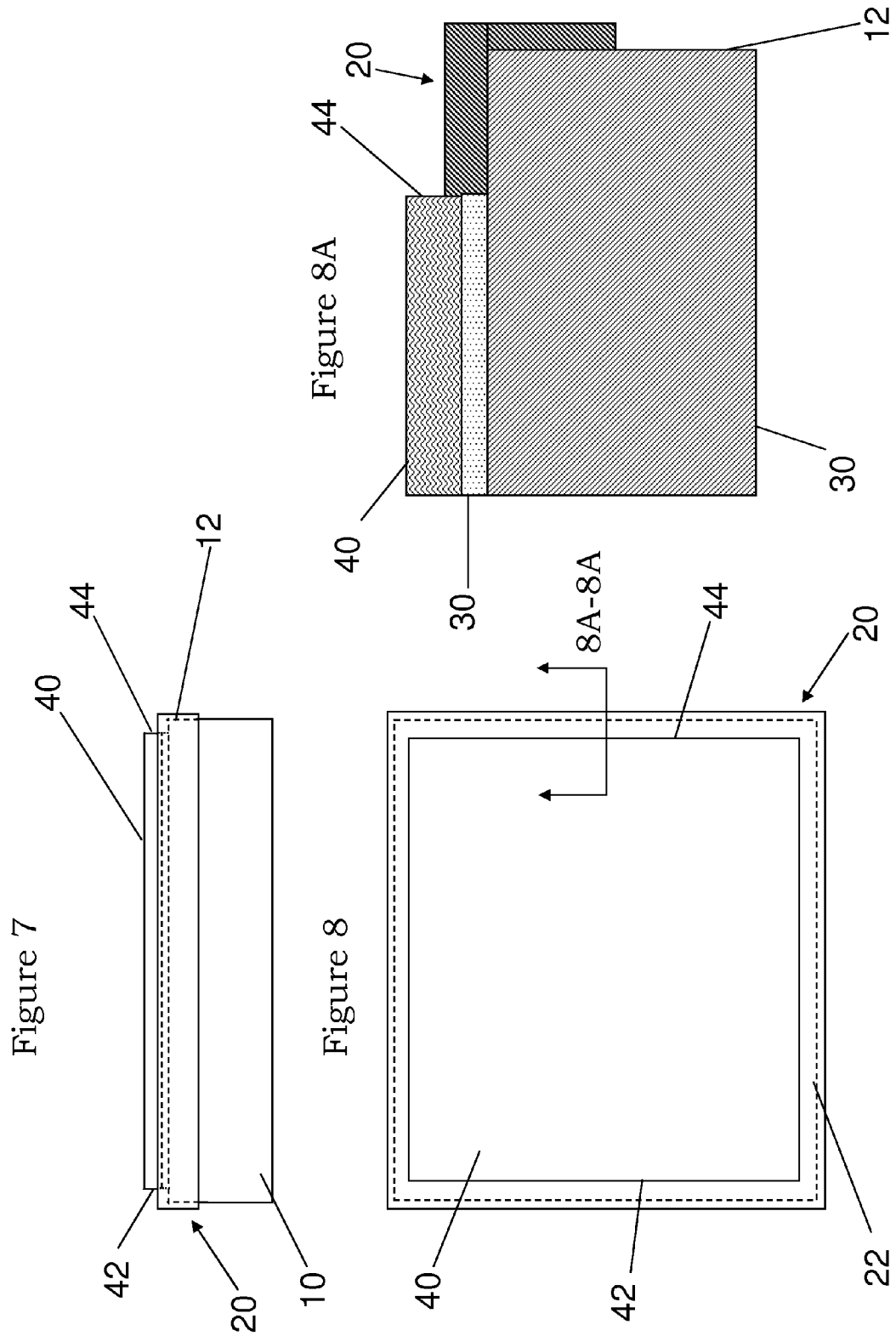

GLASS ASSEMBLY

CROSS-REFERENCE TO RELATED APPLICATIONS

This application is a continuation of U.S. application Ser. No. 12/125,046, filed on May 21, 2008 which is herein incorporated by reference in its entirety.

TECHNICAL FIELD

The disclosed embodiments relate to a frame for bonding glass components. Further embodiments relate to protective glass assemblies for LCDs or other electronic displays as well as methods for producing the same.

BACKGROUND AND SUMMARY OF THE INVENTION

In the manufacturing of electronic displays, it is sometimes necessary to bond glass components to one another. The bonded glass components may be used in the formation of LCD stack, glass front plates, or other glass features found in electronic displays. Generally, glass components are bonded using an optical adhesive interposed between the glass components. This bonding process is time consuming and subject to problems resulting in a display unfit for consumer use.

One such problem is the formation of air bubbles in the optical adhesive. As the optical adhesive is interposed between two glass components, the display is ruined. If air bubbles are formed the only options left to manufactures are either dispose of the ruined bonded glass components, or spend a large amount of time manually removing the optical adhesive from the glass components. This problem is only magnified as the size of LCD displays increase necessitating the need for larger more expensive glass components.

Another problem that occurs during the bonding process is known as the halo effect or window framing. The halo effect may be caused by using an insufficient amount of optical adhesive to maintain glass component coverage during the curing phase. As the optical adhesive cures and experience shrinking, the optical adhesive may pull away from the edges of the bonded glass components again ruining the bonded glass components and rendering the display unfit for consumer use.

Mechanical separation may also be a problem if the optical adhesive is not in sufficient amounts at the edges of the glass components. A lack of bonding material at the edge of the glass components may cause the bonded glass components to begin to separate ruining the display. This problem occurs in application such as laptops where the lid containing the LCD display is opened and closed regularly.

Another problem that may be a result of the bonding process is the formation of voids starting at the edge of the glass components. The voids develop over time through expansion and contraction cycles. The formation of voids may be accelerated in LCD displays used outdoors or other locations experiencing large temperature variations. Again as with the other possible defects listed above, the voids ruin a display.

These and other problems may be avoided by the method described and shown herein. In one exemplary embodiment of bonding glass components, a first glass component having a frame is provided, the frame being in contact with the first glass component. A sealant is used to seal the edge of the frame and the first glass component. This sealant is allowed to cure. A barrier coat is applied over the sealant. The barrier coat is allowed to cure. An adhesive is poured over the entirety on the first glass component and frame. A second glass component is placed on the frame with one end still elevated over the first glass component. The second glass component is slowly lowered till the previously elevated edge rests on the frame, resulting in an adhesive layer interposed between the second glass layer and the first glass layer and the frame.

In another exemplary embodiment, the barrier coat step is removed and the adhesive is poured directly onto the first glass component, sealant, and the frame. In still another exemplary embodiment, an edge of the second glass component is placed at the intersection of the first glass component and the frame, still having an edge elevated above the first glass component. The second glass component is slowly lowered till the previously elevated edge rests at the intersection of the first glass component and the frame, resulting in an adhesive layer interposed between the second glass layer and the first glass layer.

BRIEF DESCRIPTION OF THE DRAWING(S)

A better understanding of the disclosed embodiments will be obtained from a reading of the following detailed description and the accompanying drawings wherein identical reference characters refer to identical parts and in which:

FIG. 1 is a top view of an exemplary embodiment of a glass component having a frame.

FIG. 1A is a cross-sectional view of an embodiment of the frame in FIG. 1 taken along line 1A-1A as indicated in FIG. 1.

FIG. 2 is a side view of an exemplary embodiment of a glass component having a frame.

FIG. 3 is a side view of an exemplary embodiment of a glass component coated with adhesive.

FIG. 4 is a side view of an exemplary embodiment of a first and second glass component.

FIG. 5 is a side view of an exemplary embodiment of a bonded glass product.

FIG. 6 is a top view of an exemplary embodiment of a bonded glass product.

FIG. 6A is a magnified cross-sectional view of an embodiment of a bonded glass product in FIG. 6 taken along line 6A-6A as indicated in FIG. 6.

FIG. 7 is a side view of an exemplary embodiment of a bonded glass product.

FIG. 8 is a top view of an exemplary embodiment of a bonded glass product.

FIG. 8A is a magnified cross-sectional view of an embodiment of a bonded glass product in FIG. 8 taken along line 8A-8A as indicated in FIG. 8.

DETAILED DESCRIPTION OF EXEMPLARY EMBODIMENT(S)

FIG. 1 is an elevated top view of a first glass component 10 having defined outside edges 12. The first glass component may have a first surface 14. The first glass component may have a frame 20 positioned around the outside edges 12. FIG. 1A is a cross-sectional view of the frame 20. The frame 20 may have an L-shaped cross section having a top portion 22 and a side portion 24. The top portion 22 of the frame 20 having an inside edge 26 and an outside edge 28. The top portion 22 of the frame 20 is designed to overlap the first surface 14 of the first glass component 10, such that the outside edges 12 of the first glass component 10 contact the side portion 24 of the frame 20, as illustrated in FIG. 2. The frame 20 may be a rigid material, including, but not limited to, metal. The frame 20 may have a unitary body design. In other embodiments, the frame 20 may be constructed from multiple sections.

In exemplary embodiments, the first glass component 10 may be a LCD stack. In other embodiments, the first glass component 10 may be a front plate, such as described in U.S. Application No. 61/033,064, incorporated by reference as if fully rewritten herein. In still other embodiments, the first glass component 10 may be any glass feature found in a LCD display.

To begin the bonding process an adhesive is applied to edge 26 of the frame 20 overlapping the first glass component 10 on its first surface 12, forming a frame seal. The width and thickness of the frame seal may be sufficient to form a complete seal between the edge 26 of the frame 20 and the first surface 14 of the first glass component 10. This frame seal may prevent particulate from entering any space between the top portion 22 of the frame 20 and the first surface 14 of the first glass component 10. The adhesive may then be allowed to cure at room temperature. A variety of adhesives may be used to seal the frame 20 to the first surface 12. One example of an adhesive that may be used is Dow Corning® brand product 3145 RTV Adhesive/Sealant (hereinafter "the 3145 adhesive").

After the adhesive has had sufficient time to cure, a barrier coat may be applied over the frame seal. The barrier coat may be applied over the frame seal with a brush. In other exemplary embodiments, the barrier coat may be applied using any suitable application method. The adhesive used may be an optical adhesive. In other embodiments, the optical adhesive may be index matched. One example of an adhesive that may be used is Dow Corning® brand Product, Sylgard® 527 A&B Silicone Dielectric Gel (hereinafter "the 527 adhesive"). The 527 adhesive may comprise 1 part resin to 3 parts catalyst. However, to maximize adhesion and optical performance, the 527 adhesive may comprise 1 part resin to 1 part catalyst. After the barrier coat is applied, it is allowed to cure at room temperature.

After the barrier coat has had sufficient time to cure, skirting tape (not shown in the figures) may be applied to the side portion 24 of the frame 20. The skirting tape may be aligned such that is covers the side portion 24 of the frame 20 without contacting the top portion 24 of the frame 20. The skirting tape may be any self adhesive tape. More preferably, the skirting tape may be any self adhesive tape that is easily removable. In other exemplary embodiments, a skirting tape may not be used.

The next step in the bonding process is to apply an adhesive 30 over the entire first surface 14 of the first glass component 10 and frame 20, as illustrated in FIG. 3. The adhesive 30 may be poured so as to flood the entire first surface 14 of the first glass component 10 and cover the frame 20. The adhesive 30 may continue to be poured over the first surface 14 of the first glass component 10 and frame 20 until the adhesive 30 runs over the top portion 22 of the frame 20 and down the side portion 24. Any excess adhesive may be recovered from underneath the first glass component 10. In some embodiments, the adhesive 30 may be poured from above at approximately the center of the first surface 14. In other embodiments, the adhesive 30 may be poured from multiple positions above the first surface 14 or frame 20. The adhesive 30 used may be an optical adhesive. In other exemplary embodiments, the adhesive 30 may be index matched. One example of an adhesive 30 that may be used is Dow Corning® brand Product, Sylgard® 527 A&B Silicone Dielectric Gel (hereinafter "the 527 adhesive"). The 527 adhesive may comprise 1 part resin to 3 parts catalyst. However, to maximize adhesion and optical performance, the 527 adhesive may comprise 1 part resin to 1 part catalyst.

In other embodiments, the 527 adhesive may be replaced by photo initiated optical adhesives manufactured by Momentive Performance Materials, Incorporated (hereinafter "Momentive"). By using optical initiated optical adhesives manufactured by Momentive, some chemical incompatibilities associated with the use of the 527 adhesive may be eliminated. By eliminating the chemical incompatibilities associated with the 527 adhesive a portion of the bubble formation may also be eliminated. The use of Momentive's optical initiated adhesives may also decrease the curing times, thus increasing production times.

After the adhesive 30 has been allowed to flood the first surface 14 a second glass component 40, having a first edge 42 and a second edge 44, may be positioned for bonding. In exemplary embodiments, the second glass component 40 may be a LCD stack. In other embodiments, the second glass component 40 may be a front plate. In still other embodiments, the second glass component 40 may be any glass feature found in a LCD display.

The second glass component 40 may be positioned so that the first edge 42 is in contact with the corner formed by the intersection of the top portion 22 and side portion 24 of the frame 20. The second edge 44 may be elevated above the first surface 14 of the first glass component 10, as illustrated in FIG. 4. The second edge 44 may then be slowly lowered so as to create a wave of adhesive 30. As the second edge 44 of the second glass component 40 is lowered, the adhesive 30 wave moves across the first surface 14. By lowering the second glass component 40 in this manner, the defects associated with bonded glass components may be eliminated. After the second edge 44 of the second glass component 40 is lowered such that the second edge 44 contacts the frame 20, and is substantially parallel to the first glass component 10, it is allowed to cure at room temperature. After curing is complete the skirting tape is removed, thus removing any excess adhesive 30 from the frame 20.

The finished product is illustrated in FIGS. 5, 6, and 6A. FIG. 5 is a side view of the of the bonded glass components 10 and 40. In the embodiment shown, the perimeters of the first glass component 10 and the second glass component 40 are substantially equal. FIG. 6 is a top perspective view of the bonded glass. FIG. 6A is a magnified cross-sectional view of the bonded glass. The second glass component 40 may be in contact with the top portion 22 of the frame 20. A layer of adhesive 30 is interposed between the second glass components 40 and the first glass component 10 and the frame 20. The depth of the adhesive 30 may be substantially equal to that of the thickness of the top portion 22 of the frame 20. In this manner, the depth of the adhesive 30 may be controlled by varying the thickness of the top portion 22 of the frame 20.

In other embodiments, the second glass component 40 may have perimeter dimensions less than that of the first glass component 10. This is illustrated in FIG. 7. To bond the second glass component 40 to the first glass component 10 the first edge 42 of the second glass component 40 is positioned at the intersection of the top portion 22 of the frame 20 and the first surface 14 of the first glass component 10. The second edge 44 is elevated above the first surface 14 of the first glass component 10. The second edge 44 is slowly lowered so as to create a wave of adhesive 30. As the second edge 44 of lowered, the adhesive 30 wave moves across the first surface 14. The second edge 44 is lowered so that it may nestle in the intersection of the top portion 22 of the frame 20 and the first surface 14. FIG. 8 provides a top view of the bonded glass. FIG. 8A is a cross-sectional view of the bonded glass. In this embodiment, the second glass component 40 rests on the adhesive 30 layer rather than the frame 20 as in the embodiment illustrated in FIG. 6A.

In other exemplary embodiments, the skirting tape may be applied to both the top and side portions 22 and 24 of the frame 20. This allows for the removal of any excess adhesive 30 from the all portions of the frame 20.

In still other embodiments, the 3145 adhesive used for the frame seal is replaced by an adhesive having a lower viscosity. One example of an adhesive that may be used is Dow Corning® brand product 3140 RTV Adhesive/Sealant (hereinafter "the 3145 adhesive"). The use of an adhesive having a lower viscosity than that of the 3145 adhesive may eliminate the need for a barrier coat. In exemplary embodiments, where the barrier is no longer applied, the adhesive 30 may be poured onto the first surface 14 after the frame seal is cured.

Some embodiments of the present invention may involve displays other than LCD displays. An example would be plasma display or rear-projection television. An exemplary embodiment may be used with any type of display where bonded glass components may be used.

Having shown and described exemplary embodiments of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A frame for bonding a first protective glass component to a second protective glass component with a desired thickness of adhesive, the first glass component having a top surface and a perimeter, the frame comprising:
   a horizontal top portion sized to extend along the perimeter and overlap the top surface of the first protective glass component, wherein said horizontal top portion is configured to receive the adhesive poured on the top surface of the first protective glass component and comprises a distal surface located on a distal end thereof which is configured to contain said adhesive such that said adhesive continuously abuts said distal surface when so poured, wherein said horizontal top portion has a thickness substantially equal to the desired thickness of adhesive between the first and second protective glass components when the second protective glass component is placed atop the frame, sandwiching the frame between the first and second protective glass components; and
   a vertical side portion extending downwardly from the horizontal top portion and sized to wrap around the perimeter of the first glass component;
   wherein the horizontal top portion and the vertical side portion form an 'L' shaped cross-section.

2. The frame of claim 1 wherein:
   the horizontal top portion and vertical side portion have a unitary body.

3. The frame of claim 1 wherein:
   the horizontal top portion and vertical side portion are separate components bonded together.

4. The frame of claim 1 wherein:
   the horizontal top portion and vertical side portion are metallic.

5. A protective glass assembly comprising:
   a glass component having a top surface and a perimeter;
   a frame overlapping the top surface and perimeter of the glass component;
   a protective glass layer positioned atop the frame sandwiching the frame between the glass component and the protective glass layer; and
   a layer of adhesive interposed between the glass component and the protective glass layer such that the protective glass layer is directly bonded to the glass component;
   wherein said frame is configured to receive and contain the layer of adhesive such that the adhesive directly abuts at least a portion of the frame overlapping the top surface and the perimeter of the glass component.

6. The glass assembly of claim 5 wherein the frame comprises:
   a horizontal top portion connected to a vertical side portion.

7. The glass assembly of claim 5 wherein:
   the glass component is an LCD display.

8. The glass assembly of claim 5 wherein:
   the adhesive is an optical adhesive.

9. The glass assembly of claim 5 wherein:
   the adhesive is an index-matched optical adhesive.

10. The glass assembly of claim 5 wherein:
    the adhesive comprises 1 part resin to 1 part catalyst.

11. The glass assembly of claim 5 wherein:
    the glass component is a second protective glass layer.

12. The glass assembly of claim 5 wherein:
    the adhesive comprises 1 part resin to 3 parts catalyst.

13. The glass assembly of claim 5 wherein:
    the frame is metallic.

14. A protective glass assembly for a liquid crystal display (LCD) having a top surface and a perimeter, the protective glass assembly comprising:
    a frame overlapping the top surface and perimeter of the LCD;
    a front glass component placed atop the frame sandwiching the frame between the LCD and the front glass component, wherein the front glass component is configured to be located proximate to an intended viewer of the LCD; and
    a layer of optical adhesive interposed between the LCD and the front glass component;
    wherein said frame is configured to receive and contain said layer of optical adhesive;
    wherein the frame has a surface which extends along the perimeter and substantially vertically between the front glass component and the LCD when the front glass component is placed atop the frame;
    wherein the layer of optical adhesive directly and continuously abuts the surface when interposed between the LCD and the front glass component.

15. The protective glass assembly of claim 14 wherein the frame comprises:
    a horizontal top portion connected to a vertical side portion.

16. The protective glass assembly of claim 14 wherein:
    the frame is metallic.

17. The protective glass assembly of claim 14 wherein:
    the adhesive comprises 1 part resin to 1 part catalyst.

18. The protective glass assembly of claim 14 wherein:
    the adhesive comprises 1 part resin to 3 parts catalyst.

19. The protective glass assembly of claim 14 wherein:
    the adhesive is index-matched.

* * * * *